UNITED STATES PATENT OFFICE.

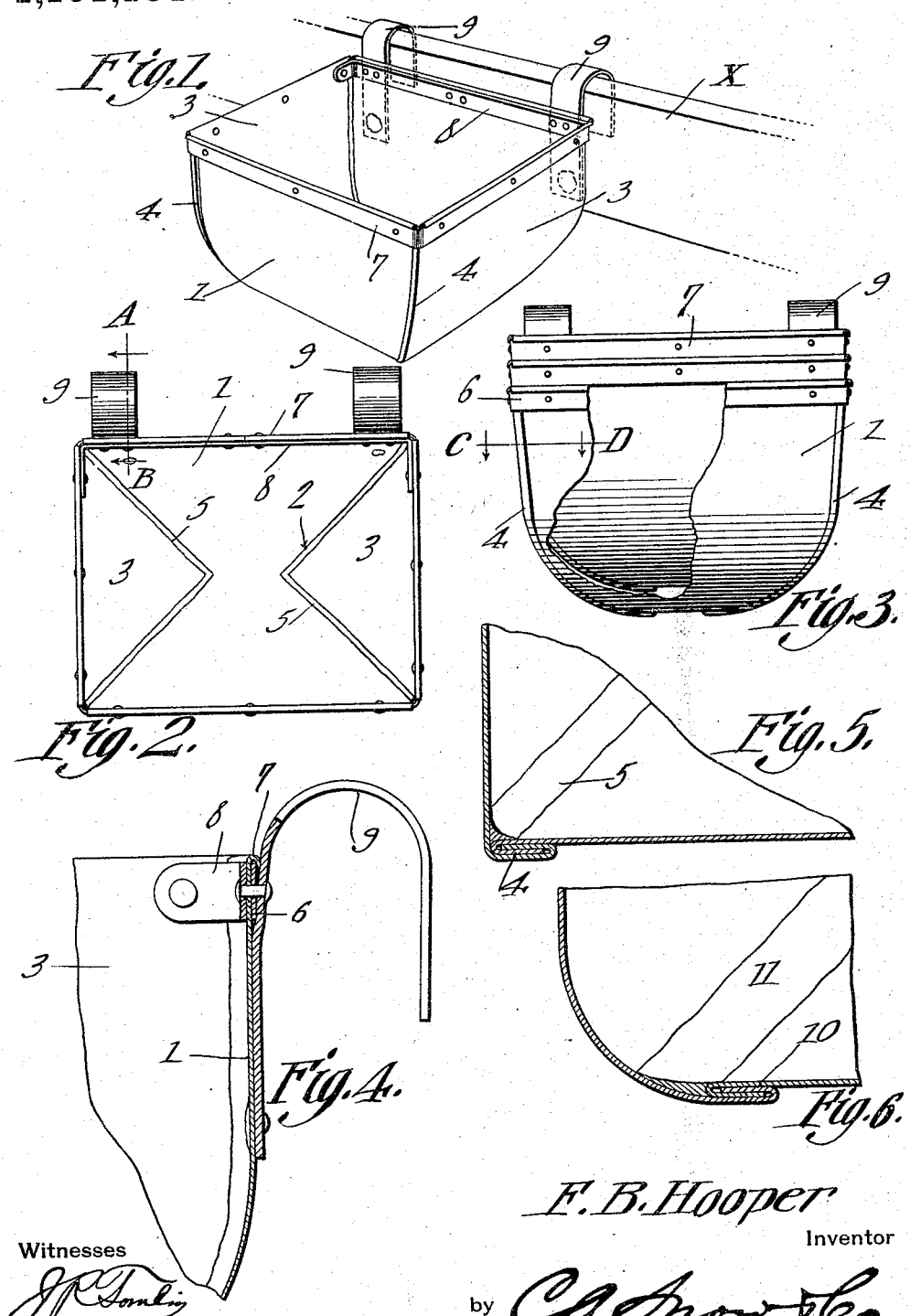

FRANK B. HOOPER, OF NEWPORT NEWS, VIRGINIA, ASSIGNOR OF FORTY ONE-HUNDREDTHS TO GEORGE T. HARDY, OF NEWPORT NEWS, VIRGINIA, FIFTEEN ONE-HUNDREDTHS TO MALCOLM G. ISDALE, OF LONDON, ENGLAND, AND FIVE ONE-HUNDREDTHS TO BENJAMIN G. SCHAFFER, OF NEWPORT NEWS, VIRGINIA.

FEED-TROUGH.

1,191,184.           Specification of Letters Patent.         Patented July 18, 1916.

Application filed February 19, 1915.   Serial No. 9,318.

*To all whom it may concern:*

Be it known that I, FRANK B. HOOPER, a citizen of the United States, residing at Newport News, in the county of Warwick and State of Virginia, have invented a new and useful Feed-Trough, of which the following is a specification.

This invention relates to troughs designed for use in feeding and watering live stock, especially while in transit aboard ships.

In ships used for the transportation of horses, cattle, and other live stock, narrow stalls are arranged in parallel rows so that each stall will contain one animal and all of the animals will face a narrow passage extending between the rows of stalls. In front of these stalls are located breast boards from which troughs are extended, these troughs extending into the passageway but being so located that the animals within the stall can eat or drink from the troughs by extending their heads over the breast boards. As each trough is to be used both for feeding and for watering the stock, it is desirable that the trough be so constructed that it will be practically free of abrupt angles in which food might accumulate so as to render cleaning of the trough difficult and to sour the water or food subsequently placed in the trough. Furthermore as a horse or the like cannot eat food lying close to a vertical wall under its neck, it is desirable that the trough be so constructed that the food cannot accumulate in such a position as to be inaccessible to the animal. It is also desirable, in view of the large number of troughs used on stock ships, to provide troughs which, while cheap to construct, are light, easy to handle, and can withstand any rough usage to which they are necessarily subjected during the handling thereof. It is also desirable that the troughs be capable of nesting so as to occupy the minimum space while not in use.

It is the object of the present invention to overcome all of the objections heretofore present in troughs provided for the purposes above outlined and to produce a trough meeting all of the requirements enumerated.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of a trough embodying the present improvement, a portion of a breast board being shown engaged thereby. Fig. 2 is a plan view of the trough. Fig. 3 is a view in elevation of several nested troughs, the outermost trough being broken away. Fig. 4 is an enlarged section on line A—B Fig. 2. Fig. 5 is an enlarged section on line C—D Fig. 3, said section being taken through one of the troughs. Fig. 6 is a view similar to Fig. 5 but taken through a slightly modified form of trough.

Referring to the figures by characters of reference 1 designates a sheet metal plate having V-shaped incisions in the sides thereof as shown at 2 for the reception of substantially V-shaped plates 3 constituting the side walls of the completed trough and the side portions of the bottom of the trough. The meeting edges of the plates 1 and 3 interlock or fold together as shown particularly at 4 in Fig. 5 thus to form reinforcing ribs upon the bottom surface of the completed trough, these ribs extending from the upper corners of the trough along downwardly converging lines to points at or adjacent the center of the bottom of the trough. The inner surfaces of the bottom and walls of the trough at the seams can be smoothed and rounded by means of solder indicated generally at 5.

It will be apparent that by arranging the plates 1 and 3 as described the resultant trough will be formed with a rounded bottom so that any material placed in the trough will gravitate toward the center of the bottom where it can be reached readily by the animal being supplied. It will be seen, furthermore, that the trough is made with its straight end and side walls diverging upwardly so that a number of troughs can be nested as indicated in Fig. 3.

Extending around the trough close to the top thereof is a reinforcing band 6 which can be riveted or otherwise secured to the walls of the trough, the upper edges of the walls being turned downwardly over the band, as shown at 7. The ends of the band come together at the back of the trough and a supplemental reinforcing strip 8 is secured along the inner surface of the back wall of the trough, it being held in place preferably by the same rivets used for holding the band 6 in position. This reinforcing strip 8 has its ends extended outwardly along the side walls of the trough as shown particularly in Figs. 1 and 2. Hooked supports or brackets 9 are secured to the back wall of the trough, the fastening rivets being extended through these brackets and through the band 6 and strip 8. These brackets 9 are designed to engage the breast board X which is ordinarily extended in front of the stalls although it is to be understood that it can be supported in any other suitable manner.

It has been found that by constructing a trough in the manner set forth, thus giving it a dome-shape approaching a semi-spherical configuration, the strength of the trough is greatly increased over that of troughs which are rectangular or semi-cylindrical in that the trough, when subjected to pressure on the bottom either in an upward or downward direction is prevented from buckling not only because of the peculiar configuration of the trough but because it is materially reinforced by the ribs 4 which converge toward the center of the trough. It has been found in actual practice that a trough made of comparatively thin sheet metal will, when inverted, support a weight of over two hundred pounds without buckling under the load.

Where the bottom of the trough has been made up of the four walls converging downwardly, it will be seen that the contents of the trough gravitate to the center of the bottom where they can be reached readily by the stock being supplied. Thus the objectionable features present in semi-cylindrical or in rectangular troughs are overcome.

Troughs of the type mentioned present angles along two or more of the walls at the bottom of the trough where food will collect and from which the food cannot be removed by the animals. Furthermore, these angles tend to retain accumulations of food which are difficult to remove with the result that water or food subsequently placed in the trough is likely to become sour and thus rendered objectionable. This is an item of considerable importance where hundreds of troughs are employed on board a single ship as the time and labor necessary to cleaning the same are greatly lessened. While the trough is preferably provided with a substantially rectangular top portion, it is to be understood that the corners of the trough can be rounded as shown in Fig. 6, if desired, this modified structure, however, retaining the reinforcing ribs or seams as shown at 10 and also retaining the solder 11 for closing the grooves formed above the seams.

Having thus described the invention, what is claimed is:—

A stock feed trough of rectangular plan and having a rounded bottom, the same consisting of front and rear walls formed of a single blank of sheet metal, downwardly curved between said walls to form a bottom section having angular side incisions of which the sides diverge from points near the center of the bottom and extend respectively to the side edges of the front and rear walls, and side walls each formed of a single blank of sheet metal extended and curved to provide an angular portion fitting in one of said angular incisions of the first named blank to complete the bottom, the adjoining edges of said elements being overlapped and jointed.

In testimony that I claim the foregoing as my own, I have hereto affixed my signature in the presence of two witnesses.

FRANK B. HOOPER.

Witnesses:
H. W. GODFREY,
T. F. STENNETT.

Copies of this patent may be obtained for five cents each, by addressing the "Commissioner of Patents, Washington, D. C."